(12) United States Patent
Shen et al.

(10) Patent No.: US 7,773,394 B2
(45) Date of Patent: Aug. 10, 2010

(54) DIGITAL LATCH CONTROL CIRCUIT FOR OVER-VOLTAGE PROTECTION AND POWER CONVERTER USING THE CONTROL CIRCUIT

(75) Inventors: Yi-Lun Shen, Hsin-Chu (TW); Da-Chun Wei, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 317 days.

(21) Appl. No.: 12/116,214

(22) Filed: May 7, 2008

(65) Prior Publication Data
US 2009/0279329 A1   Nov. 12, 2009

(51) Int. Cl.
*H02H 7/122* (2006.01)
*H02M 3/335* (2006.01)

(52) U.S. Cl. .................... 363/56.11; 363/56.12

(58) Field of Classification Search .............. 363/21.08, 363/21.16, 56.05, 56.09, 56.11, 56.12
See application file for complete search history.

(56) References Cited

U.S. PATENT DOCUMENTS 7,133,300 B1 *  11/2006  Yang ................. 363/56.11

* cited by examiner

*Primary Examiner*—Gary L Laxton
(74) *Attorney, Agent, or Firm*—Winston Hsu

(57) ABSTRACT

An AC/DC power supply with over-voltage protection includes a voltage converting circuit and a digital latch control circuit. The voltage converting circuit has a first-side winding, a second-side winding, and an auxiliary winding for providing a supply voltage according to the AC input voltage. The digital latch control circuit is coupled to the voltage converting circuit and utilized for latching a voltage level of the supply voltage at a first predetermined level according to an over-voltage protection (OVP) trigger signal, where the voltage converting circuit is disabled when the voltage level is latched at the first predetermined level.

16 Claims, 6 Drawing Sheets

DIGITAL LATCH CONTROL CIRCUIT FOR OVER-VOLTAGE PROTECTION AND POWER CONVERTER USING THE CONTROL CIRCUIT

BACKGROUND OF THE INVENTION

1. Field of the Invention

The present invention relates to a latch control circuit, and more particularly, to a digital latch control circuit applied for over-voltage protection.

2. Description of the Prior Art

Generally speaking, a power converter utilizes an over-voltage protection scheme to prevent an internal high voltage signal from exceeding a particular voltage level. Please refer to FIG. 1, which is a schematic diagram of a conventional power converter 100. The power converter 100 is a flyback converter comprising a bridge rectifier 105, a transformer TX1 having a primary-side winding $L_P$, second-side winding $L_S$, and an auxiliary winding $L_{aux}$, a diode $D_1$, capacitors $C_1$ and $C_2$, resistors $R_1$, $R_2$, $R_p$, and $R_n$, transistors $Q_1$ and $Q_2$, and a de-glitch circuit 110. Those skilled in this art should appreciate circuit design of this flyback converter, and detailed description for the circuit design of the power converter 100 is not illustrated for brevity. The above-mentioned over-voltage protection scheme applied to the power converter 100 is for detecting whether the level of the supply voltage $V_{CC}$ at the capacitor $C_2$ becomes over higher, for avoiding damage to internal circuit elements within the power converter 100. If the power converter 100 does not include the resistors $R_p$ and $R_n$ and the transistors $Q_1$ and $Q_2$, the primary-side winding $L_P$ of the transformer TX1 does not transfer energy from the AC input voltage $V_{AC}$ to the secondary-side winding $L_S$ when detecting the supply voltage $V_{CC}$ becoming overly high (i.e., an abnormal condition). The auxiliary winding $L_{aux}$ cannot obtain the energy coming from the AC input voltage $V_{AC}$, so the level of the supply voltage $V_{CC}$ decreases. The primary-side winding $L_P$ transfers the energy from the AC input voltage $V_{AC}$ to the secondary-side winding $L_S$ until the supply voltage $V_{CC}$ becomes equal to or lower than a voltage level at which the internal circuit elements within the power converter 100 can work normally. But, if the abnormal condition still exists, the level of the supply voltage $V_{CC}$ will increase and become overly high again. In other words, if an abnormal condition to the power converter 100 still exists, the level of the supply voltage $V_{CC}$ will repeatedly exceed the threshold and drop lower.

The power converter 100 may include resistors $R_p$ and $R_n$ and transistors $Q_1$ and $Q_2$ for solving the above-described problems. With regards to other circuit elements within the power converter 100, the resistors $R_p$ and $R_n$ and the transistors $Q_1$ and $Q_2$ are externally coupled circuit elements. When detecting that the supply voltage $V_{CC}$ becomes overly high, an over-voltage protection trigger signal $OVP_{trigger}$ is triggered and then sent to the base terminal (i.e., node $N_1$) of transistor $Q_2$ to increase the voltage level at node $N_1$ and turn on transistor $Q_2$. Since the transistor $Q_2$ becomes conductive, the voltage level at node $N_2$ decreases so that transistor $Q_1$ then also becomes conductive. In this situation, although the level of the over-voltage protection trigger signal $OVP_{trigger}$ is not kept at a high logic level, the voltage level at node $N_1$ increases since the transistor $Q_1$ becomes conductive. As a result, the transistors $Q_1$ and $Q_2$ are eventually fully turned on, and the level of the supply voltage $V_{CC}$ becomes lower and is maintained at a lower level, which is caused by a voltage division resulting from the AC input voltage $V_{AC}$ passing through diodes of the bridge rectifier 105, the resistor $R_1$, and an impedance formed by the resistors $R_p$ and $R_n$ being connected in parallel. Therefore, the level of the supply voltage $V_{CC}$ will not repeatedly become cycle overly higher and then lower.

The power converter 100, however, still has some drawbacks. The transistors $Q_1$ and $Q_2$ and the resistors $R_p$ and $R_n$ form an analog circuit, the transistors $Q_1$ and $Q_2$ are not conductive under normal condition, and nodes $N_1$ and $N_2$ are seen as high impedance points. In this situation, the impedances seen from nodes $N_1$ and $N_2$ are very high. If noise arises, it can easily make the transistors $Q_1$ and $Q_2$ become conductive so that the power converter 100 operates erroneously. In order to solve this problem, it is necessary to add a de-glitch circuit (e.g., the de-glitch circuit 110 of the power converter 100 shown in FIG. 1) at node $N_1$. Doing so, however, increases production costs and need larger circuit area. In addition, since the de-glitch circuit 110 has to operate when the power converter 100 powers on, additional current must be provided for the de-glitch circuit 110 when the power converter 100 powers on.

SUMMARY OF THE INVENTION

According to embodiments of the present invention, a power converter with over-voltage protection comprises a voltage converting circuit and a digital latch control circuit. The voltage converting circuit includes a transformer having a primary-side winding, a secondary-side winding, an auxiliary winding, where the auxiliary winding is utilized for providing a supply voltage. The digital latch control circuit is coupled to the voltage converting circuit and is utilized for latching a voltage level of the supply voltage at a first predetermined level when receiving an over-voltage protection trigger signal. The voltage converting circuit is disabled when the voltage level is latched at the first predetermined level.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
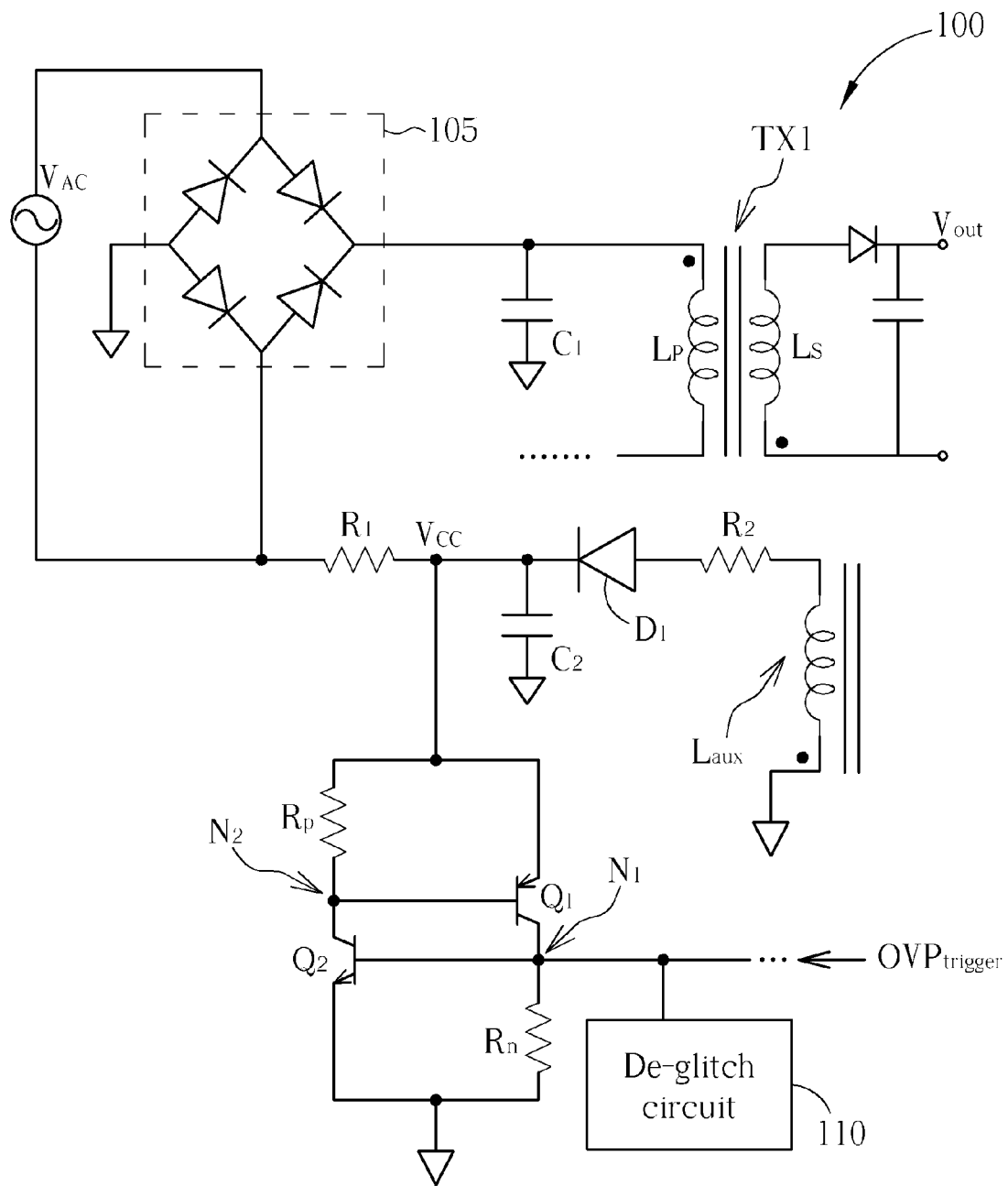
FIG. 1 is a schematic diagram of a conventional power converter.
Figure 2:
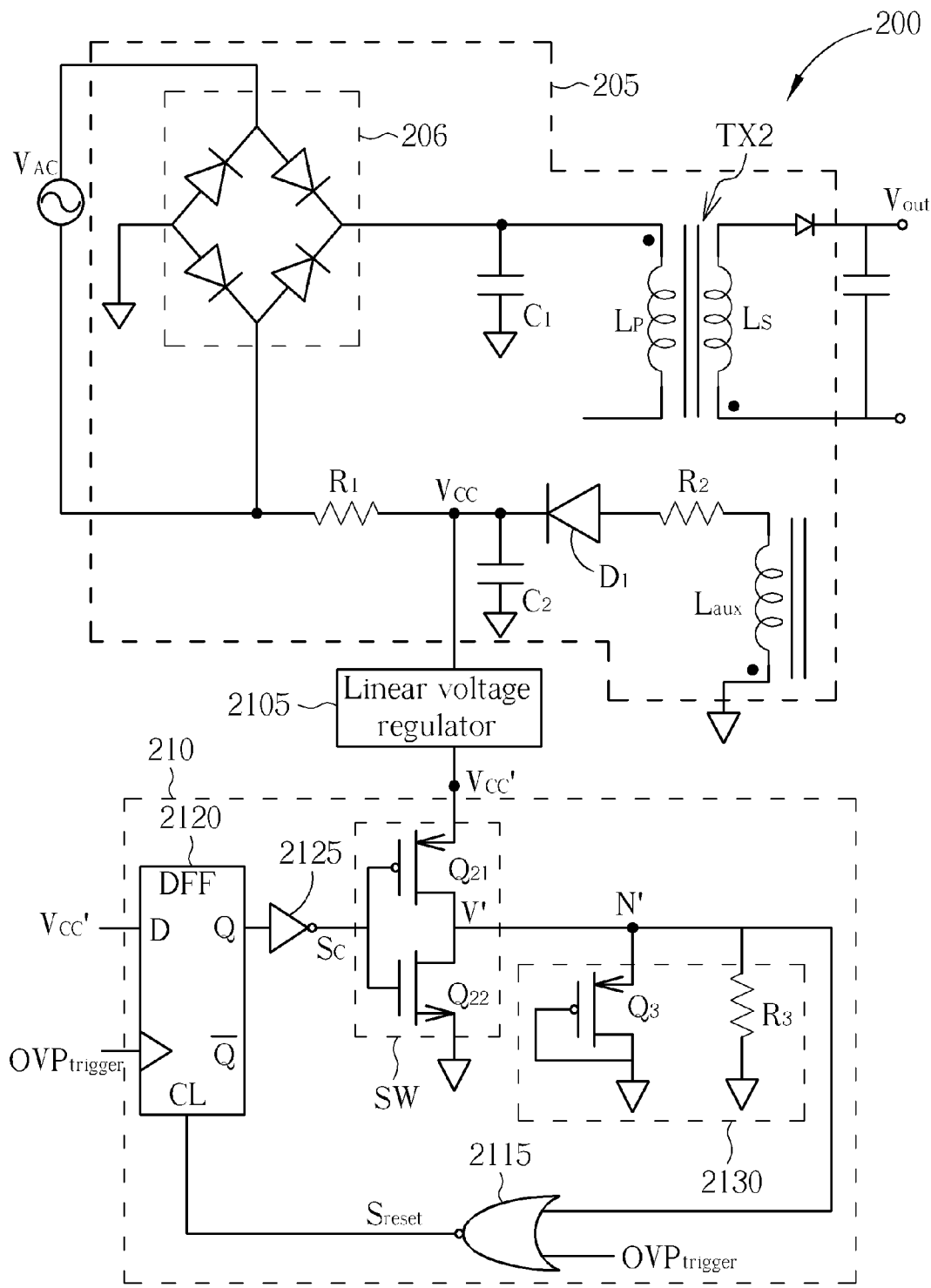
FIG. 2 is a schematic diagram of an AC-to-DC power converter according to an embodiment of the present invention.

Please refer to FIG. 2. FIG. 2 is a schematic diagram of an AC-to-DC power converter 200 according to an embodiment of the present invention. As shown in FIG. 2, the power converter 200 is a flyback converter and comprises a voltage converting circuit 205 and a digital latch control circuit 210. The voltage converting circuit 205 includes a bridge rectifier 206, an input filter capacitor $C_1$, a transformer TX2, resistors $R_1$ and $R_2$, a diode $D_1$, and a capacitor $C_2$. The bridge rectifier 206 is utilized for rectifying an AC input voltage $V_{AC}$ to a pulse DC voltage. The pulse DC voltage is filtered by the input filter capacitor $C_1$ and then a DC input voltage is generated. The transformer TX2 includes a primary-side winding $L_P$, a secondary-side winding $L_S$, and an auxiliary winding $L_{aux}$, where operations of the primary-side winding $L_P$ and the secondary-side winding $L_S$ are not detailed for brevity. Briefly, the voltage converting circuit 205 is used for converting the input voltage $V_{AC}$ into an output voltage $V_{out}$ and an output voltage $V_{CC}$; the output voltage $V_{CC}$ is provided by the auxiliary winding $L_{aux}$, resistor $R_2$, diode $D_1$, and the capacitor $C_2$. When the voltage level of the output voltage $V_{out}$ is higher than a protection threshold level, an over-voltage detection circuit (not shown in this figure) in the power converter 200 generates an over-voltage protection trigger signal $OVP_{trigger}$.

The purpose of the digital latch control circuit 210 is to latch the level of the supply voltage $V_{CC}$ at a first predetermined level $V_1$ when receiving the over-voltage protection trigger signal $OVP_{trigger}$. When the level of the supply voltage $V_{CC}$ is latched at the first predetermined level $V_1$, the voltage converting circuit 205 is disabled and therefore cannot operate. After users plug the power converter 100 in again, the abnormal condition is resolved.

The power converter 200 further comprises a voltage regulator, for example, a linear voltage regulator 2105. The linear voltage regulator 2105 is used for converting the supply voltage $V_{CC}$ into a converted voltage $V_{CC}'$, which is lower than the supply voltage $V_{CC}$. The digital latch control circuit 210 is utilized for latching the voltage level of the converted voltage $V_{CC}'$ at a second predetermined level $V_2$ in a digital manner, to latch the level of the supply voltage $V_{CC}$ at the first predetermined level $V_1$. Compared to the conventional power converter 100 implemented with analog circuit elements for achieving the latch function, the digital latch control circuit 210 of this invention can be implemented by digital circuit elements for achieving the latch function, and the circuit elements can be low voltage elements, thereby reducing the circuit costs. Particularly, the digital latch control circuit 210 includes a complementary switch unit SW formed by transistors $Q_{21}$ and $Q_{22}$, a resistor unit 2130, and a control module. The resistor unit 2130 includes a transistor $Q_3$ and a resistor $R_3$, and the control module is formed by a NOR gate 2115, a D-type flip flop (DFF) 2120, and an inverter 2125. The complementary switch unit SW selectively turns on one of the transistors $Q_{21}$ and $Q_{22}$ according to a control signal $S_c$. When the transistor $Q_{21}$ is conductive, the transistor $Q_{22}$ becomes non-conductive; otherwise, the transistor $Q_{22}$ becomes conductive when the transistor $Q_{21}$ is non-conductive. The control module generates the control signal $S_c$ to control the complementary switch unit SW according to the over-voltage protection trigger signal $OVP_{trigger}$, the converted voltage $V_{CC}'$ corresponding to the supply voltage $V_{CC}$, and the voltage $V'$ at drain terminals of the transistors $Q_1$ and $Q_2$. When the control signal $S_c$ controls the transistor $Q_{21}$ to become conductive and controls the transistor $Q_{22}$ to become non-conductive, the voltage level of the supply voltage $V_{CC}$ is latched at the first predetermined level $V_1$ because of voltage division.

Figure 3:
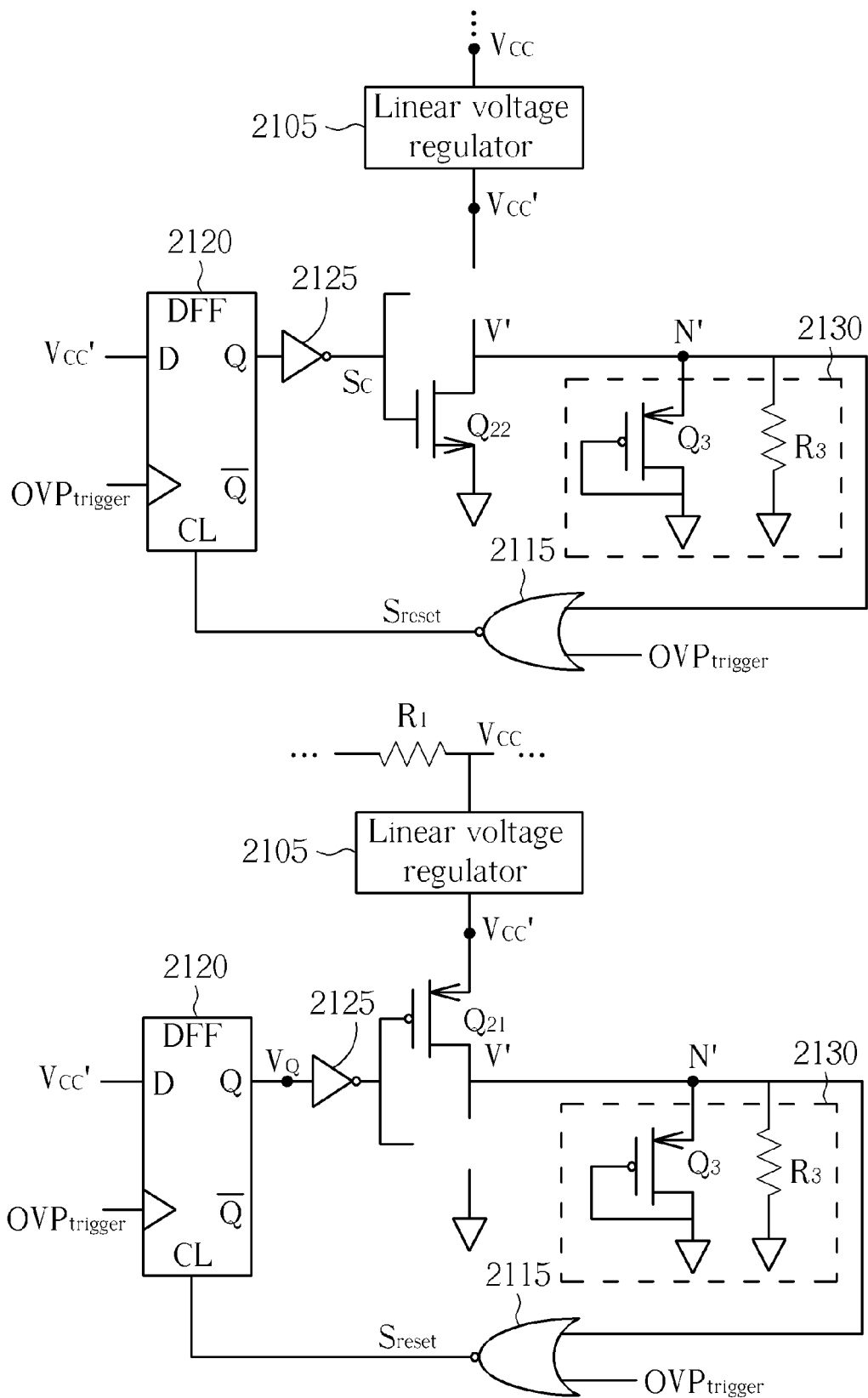
FIG. 3 is a diagram illustrating normal operation and latch operation of the digital latch control circuit shown in FIG. 2.
Figure 4:
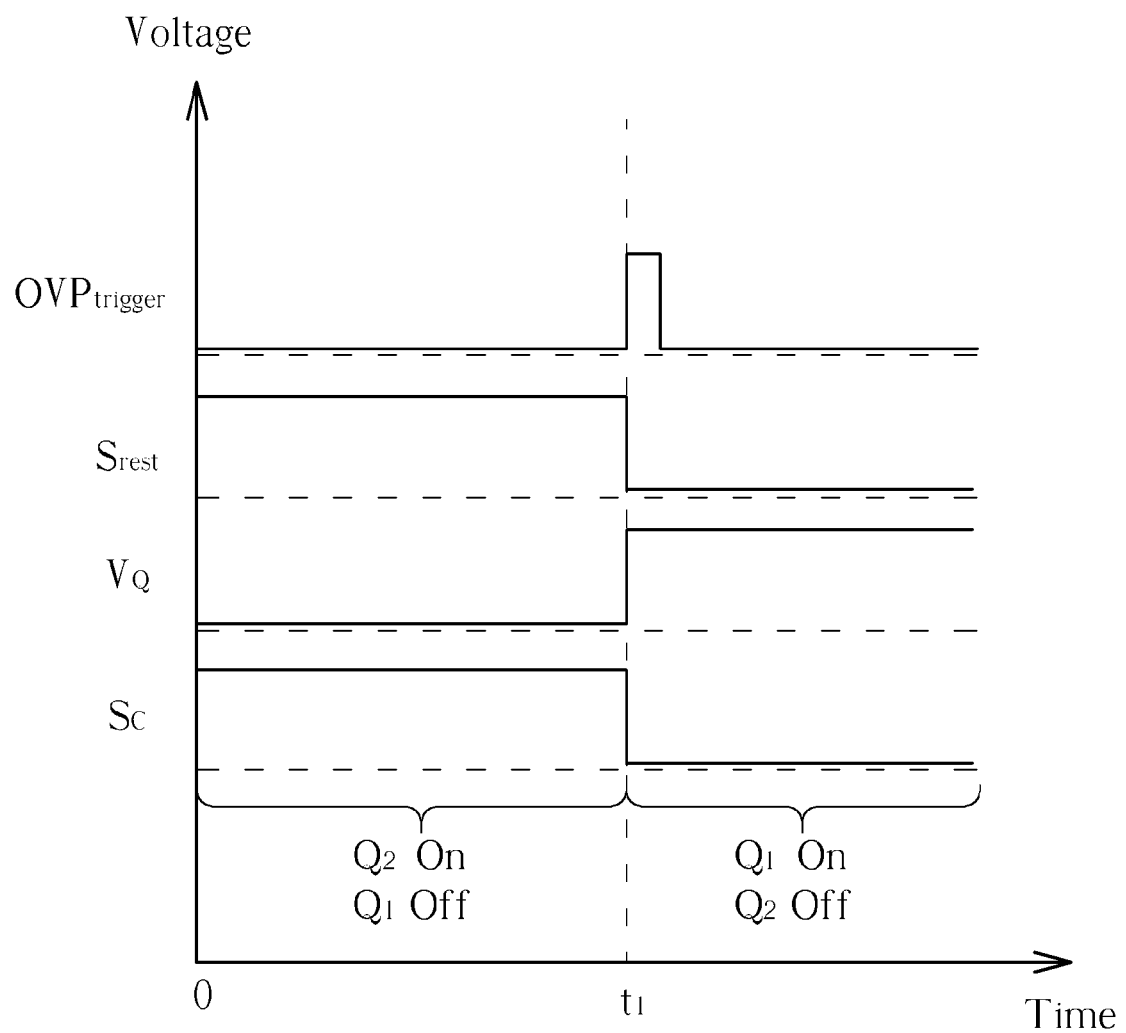
FIG. 4 is a timing diagram of the normal operation and latch operation of the digital latch control circuit shown in FIG. 2.

Please refer to FIG. 3 in conjunction with FIG. 4. FIG. 3 is a diagram illustrating normal operation and digital latch operation of the digital latch control circuit 210 shown in FIG. 2 respectively. FIG. 4 is a timing diagram of the normal operation and latch operation of the digital latch control circuit 210 shown in FIG. 2. As shown in the top half of FIG. 3, since no over-voltages appear at the supply voltage $V_{CC}$ during normal operation of the digital latch control circuit 210, the over-voltage protection trigger signal $OVP_{trigger}$ continues to maintain at a low logic level before timing $t_1$ shown in FIG. 4. The NOR gate 2115 outputs a reset control signal $S_{reset}$ having a high logic level to the reset input terminal CL of the DFF 2120. Consequently, the DFF 2120 outputs an output signal $V_Q$ having the low logic level to the inverter 2125 according to the received reset control signal $S_{reset}$ through the data output terminal Q. The inverter 2125 then inverts the output signal $V_Q$ to obtain a control signal $S_c$ having a high logic level, where under this condition the control signal $S_c$ controls the transistor $Q_{22}$ to become conductive, but controls the transistor $Q_{21}$ to be non-conductive. Since the supply voltage $V_{CC}$ is not connected to any path connected to ground level, the voltage converting circuit 205 operates normally.

As shown in bottom half of FIG. 3, when an over-voltage appears at the supply voltage $V_{CC}$, the digital latch control circuit 210 performs a digital latch operation (after time $t_1$). The over-voltage results in the over-voltage protection trigger signal $OVP_{trigger}$ having a short pulse with a high logic level, and this causes the NOR gate 2115 to output the reset control signal $S_{reset}$ having the low logic level. After the DFF 2120 receives the reset control signal $S_{reset}$ having the low logic level, and the over-voltage protection trigger signal $OVP_{trigger}$ having a short pulse with high logic level is received at the clock input terminal of the DFF 2120 itself, the DFF 2120 transmits the converted voltage $V_{CC}'$ from the data input terminal D to the output terminal as the output signal $V_Q$. The converted voltage $V_{CC}'$ is obtained through the linear voltage regulator 2105 from the supply voltage $V_{CC}$ and has a lower level; the level of the converted voltage $V_{CC}'$, however, is still considered a high logic level for the DFF 2120 and inverter 2125. Therefore, the level of the control signal $S_c$ outputted by the inverter 2125 switches from a high to a low logic level such that the transistor $Q_{21}$ becomes conductive and the transistor $Q_{22}$ does not become conductive. In this situation, since the AC input voltage $V_{AC}$ is connected to the ground level via the diodes, the resistor $R_1$, the linear voltage regulator 2105, the transistors $Q_{21}$, and the resistor unit 2130, the converted voltage $V_{CC}'$ latches at the second predetermined level $V_2$ based on voltage division result, and the supply voltage $V_{CC}$ latches at the first predetermined level $V_1$. The design of the first predetermined level $V_1$ is to disable the voltage converting circuit 205 and make it incapable of operating. Thus, it is necessary for a user to plug the power converter 200 into AC power again to resolving the abnormal condition. Accordingly, when using the power converter 200, when detecting that the voltage converting circuit 205 is disabled, the user can deduce that an abnormal condition to the power converter 200 occurred and the user should plug the power converter 200 into AC power again to resolve the abnormal condition.

To summarize, in this embodiment, when an over-voltage appears in the supply voltage $V_{CC}$, the DFF 2120 is triggered by the short pulse of the over-voltage protection trigger signal $OVP_{trigger}$. This causes the output signal of the DFF 2120 to be latched at a predetermined level to thereby achieve the purpose for latching the supply voltage $V_{CC}$ at the first predetermined level $V_1$. The above-mentioned operation is namely the digital latch operation.

When the digital latch control circuit 210 latches the supply voltage $V_{CC}$ at the first predetermined level $V_1$, in order to maintain the operations of the digital circuits within the digital latch control circuit 210, it is still necessary for the converted voltage $V_{CC}'$ to be higher than a specific level at least. If the resistor $R_3$ for voltage division has a fixed resistance and a manufacturing process variation of the transistor $Q_{21}$ is introduced, after the voltage division, it cannot be assured that the voltage level at node N', i.e. the voltage level V' at the drain terminal of the transistor $Q_{22}$, is maintained at the high logic level to ensure performing the digital latch operation. Therefore, in this embodiment, the transistor $Q_3$ acts as a variable resistor for voltage division.

When the power converter 200 just turns on, there is a possibility that the transistors $Q_{21}$ and $Q_3$ are non-conductive. The resistor $R_3$ having smaller resistance can ensure that the voltage level at node N' (i.e. the voltage level V' at the drain terminal of the transistor $Q_{22}$) can be maintained at the low logic level, to prevent the digital latch control circuit 210 from operating erroneously. Accordingly, in this embodiment, the resistor unit 2130 implemented with the transistor $Q_3$ and resistor $R_3$ is a preferred choice. In addition to the above-described operation, the resistor unit 2130 further acts as a de-glitch circuit. The transistor $Q_3$ and resistor $R_3$ form a variable resistor. Hence, if any noise occurs, the impedance seen from node N' is a small value before the digital latch control circuit 210 latches the supply voltage $V_{CC}$ at the first predetermined level $V_1$. Therefore, a voltage variation due to noise can be discharged rapidly through the resistor unit 2130, thereby preventing the digital latch control circuit 210 from operating erroneously.

Figure 5:
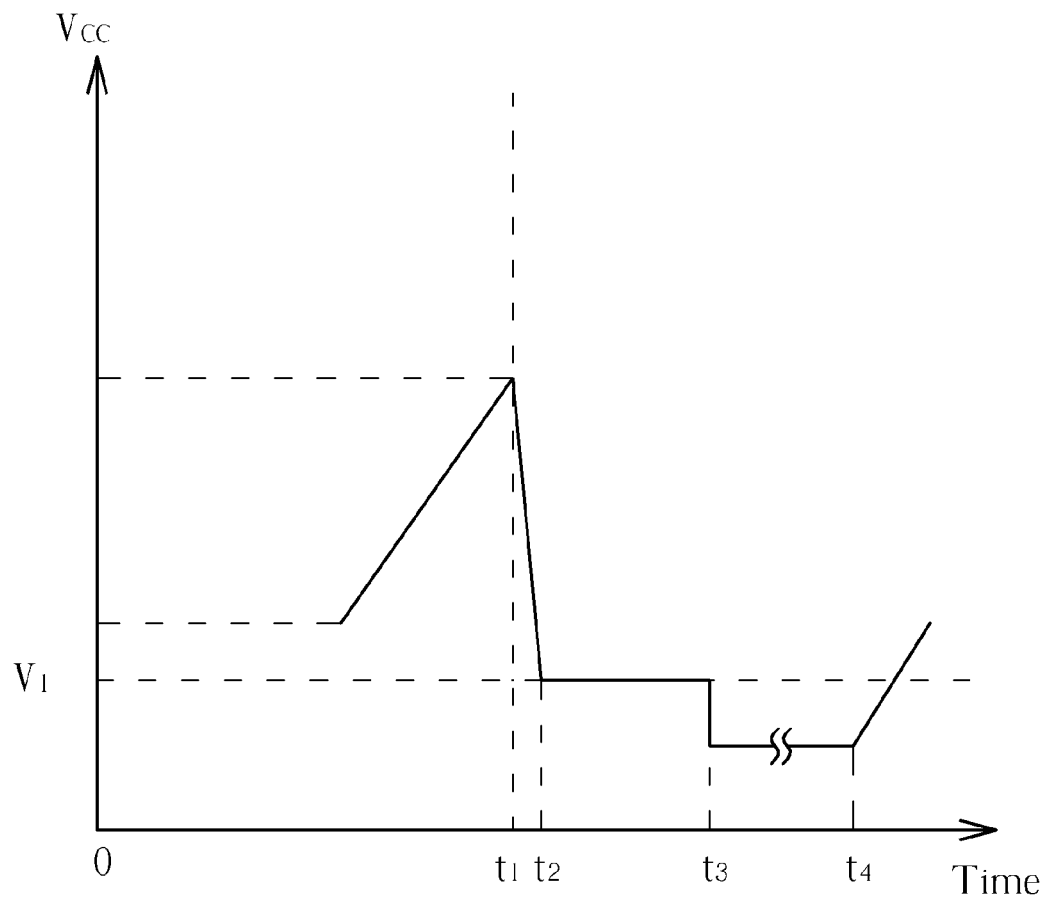
FIG. 5 is a diagram illustrating a waveform of the supply voltage $V_{CC}$ shown in FIG. 2.

Please refer to FIG. 5. FIG. 5 is a diagram illustrating the waveform of the supply voltage $V_{CC}$ shown in FIG. 2. As shown in FIG. 5, at time $t_1$, an over-voltage appears in the supply voltage $V_{CC}$. At time $t_2$, the supply voltage $V_{CC}$ is latched at the first predetermined level $V_1$. During times $t_3$ and $t_4$, a user plugs the power converter 200 into AC power again. After time $t_4$, the power converter 200 operates normally, since the originally abnormal condition has been resolved. In addition, the digital latch control circuit 210 is implemented by a digital circuit. The problem of a high impedance resulting from the conventional latch control circuit being an analog circuit does not occur in this embodiment. Therefore, the power converter 200 has excellent de-glitching capability. It is not required for the power converter 200 to use another de-glitch circuit for de-glitching during start-up, avoiding the necessity to provide additional currents during start-up.

Figure 6:
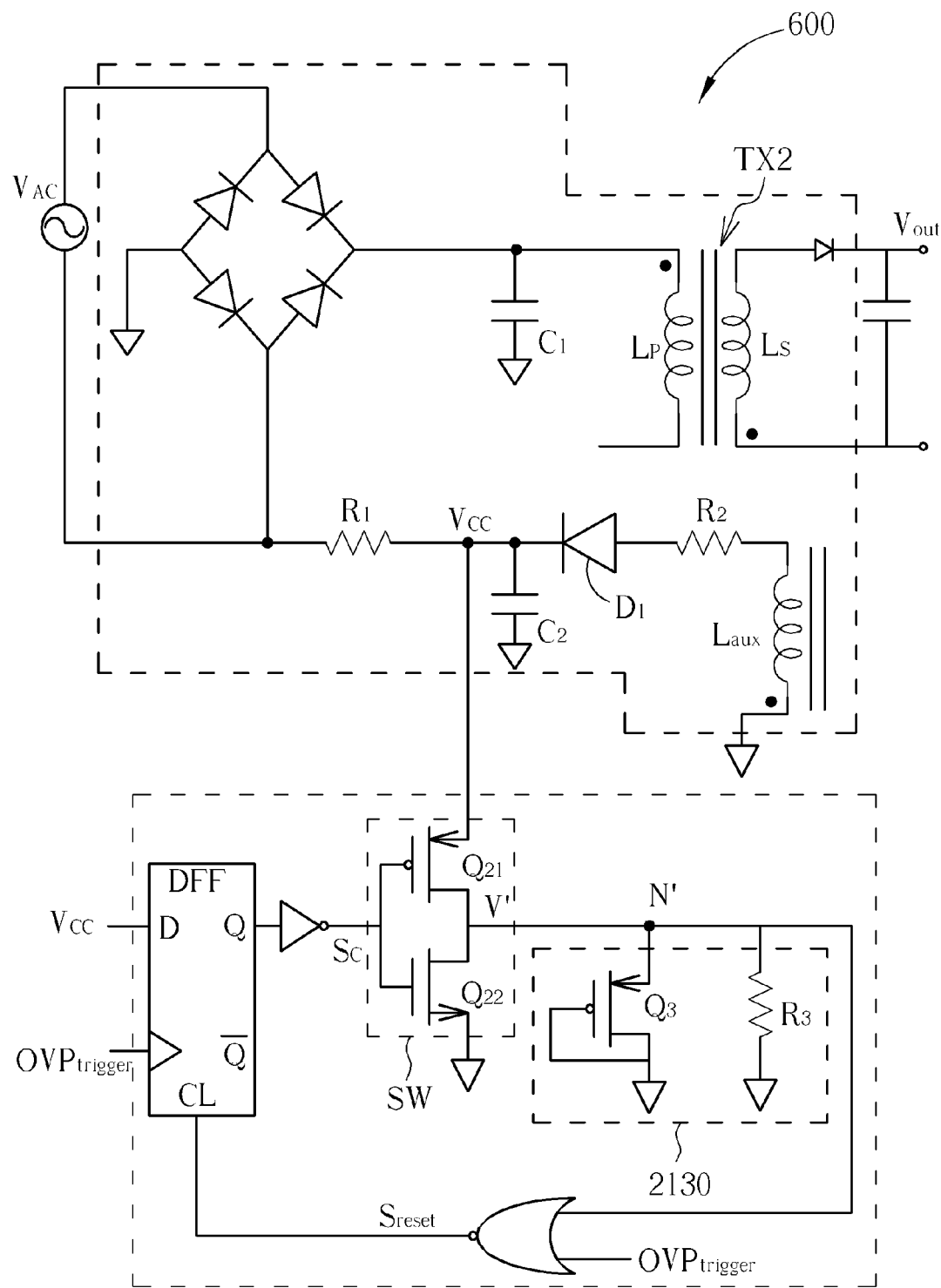
FIG. 6 is a schematic diagram of a power converter according to another embodiment of the present invention.

Furthermore, the linear voltage regulator 2105 is an optional circuit element. The voltage regulator 2105 is removable in another embodiment. Please refer to FIG. 6. FIG. 6 is a schematic diagram of a power converter 600 according to another embodiment of the present invention. In this embodiment, even though the power converter 600 does not include a linear voltage regulator, the power converter 600 can still latch onto the supply voltage $V_{CC}$ of FIG. 6 at a specific level. Therefore, this also falls within the scope of the present invention. Since the elements and related circuit connections of the power converter 600 are identical to those of the power converter 200 shown in FIG. 2 except the linear voltage regulator 2105, a person skilled in this art should appreciate detailed operation of the power converter 600 after reading the above-mentioned disclosure; further description for the operation of the power converter 600 is therefore not detailed here for brevity.

Those skilled in the art will readily observe that numerous modifications and alterations of the device and method may be made while retaining the teachings of the invention.

What is claimed is:

1. A power converter with over-voltage protection, comprising:
    a voltage converting circuit having a transformer, the transformer including a primary-side winding, a secondary-side winding, and an auxiliary winding where the auxiliary winding is utilized for providing a supply voltage; and
    a digital latch control circuit, coupled to the voltage converting circuit, for latching a voltage level of the supply voltage at a first predetermined level in a digital manner according to an over-voltage protection trigger signal;
    wherein the voltage converting circuit is disabled when the voltage level is latched at the first predetermined level.

2. The power converter of claim 1, wherein the digital latch control circuit comprises:
    a complementary switch unit, having a first transistor and a second transistor, the complementary switch unit selectively turning on one of the first and second transistors according to a control signal;
    a resistor unit, coupled to ground level and the second terminals of the first and second transistors; and
    a control module, coupled to the resistor unit and the complementary switch unit, for generating the control signal to control the complementary switch unit according to the over-voltage protection trigger signal, the supply voltage, and a voltage level at the second terminals of the first and second transistors;
    wherein the voltage level of the supply voltage is latched at the first predetermined level when the control module controls status of the first transistor to become conductive and status of the second transistor not to become conductive.

3. The power converter of claim 2, wherein the control module comprises:
    a logic gate, coupled to the second terminals of the first and second transistors, for receiving the voltage level at the second terminals of the first and second transistors and the over-voltage protection trigger signal to output a reset control signal; and
    a flip flop, having a reset input terminal coupled to the logic gate for receiving the reset control signal, a data input terminal for receiving the supply voltage, a clock input terminal for receiving the over-voltage protection trigger signal, and a data output terminal for generating an output signal corresponding to the control signal.

4. The power converter of claim 2, wherein the resistor unit comprises:
    a third transistor, having a first terminal, a second terminal, and a control terminal, wherein the first terminal of the third transistor is coupled to the second terminals of the first and second transistors and the second and control terminals of the third transistor are coupled to the ground level.

5. The power converter of claim 2, wherein the resistor unit comprises:
    a resistor, coupled to the second terminals of the first and second transistors.

6. The power converter of claim 1, further comprising:
    a voltage regulator, coupled to the voltage converting circuit, for converting the supply voltage into a converted voltage being lower than the supply voltage;
    wherein the digital latch control circuit is coupled to the voltage regulator for latching the converted voltage at a second predetermined level so as to latch the voltage level of the supply voltage at the first predetermined level.

7. The power converter of claim 1, wherein the voltage regulator is a linear voltage regulator.

8. A digital latch control circuit for over-voltage protection, an auxiliary winding of a power converter being utilized for providing a supply voltage, the digital latch control circuit being used for latching a voltage level of the supply voltage at a first predetermined level according to an over-voltage protection trigger signal, and the digital latch control circuit comprises:
- a complementary switch unit, having a first transistor and a second transistor, the complementary switch unit selectively turning on one of the first and second transistors according to a control signal;
- a resistor unit, coupled to ground level and the second terminals of the first and second transistors; and
- a control module, coupled to the resistor unit and the complementary switch unit, for generating the control signal to control the complementary switch unit according to the over-voltage protection trigger signal, the supply voltage, and a voltage level at the second terminals of the first and second transistors;
- wherein the voltage level of the supply voltage is latched at the first predetermined level when the control module controls status of the first transistor to become conductive and status of the second transistor not to become conductive.

9. The digital latch control circuit of claim 8, wherein the control module comprises:
- a logic gate, coupled to the second terminals of the first and second transistors, for receiving the voltage level at the second terminals of the first and second transistors and the over-voltage protection trigger signal to output a reset control signal; and
- a flip flop, having a reset input terminal coupled to the logic gate for receiving the reset control signal, a data input terminal for receiving the supply voltage, a clock input terminal for receiving the over-voltage protection trigger signal, and a data output terminal for generating an output signal corresponding to the control signal.

10. The digital latch control circuit of claim 8, wherein the resistor unit comprises:
- a third transistor, having a first terminal, a second terminal, and a control terminal, the first terminal of the third transistor being coupled to the second terminals of the first and second transistors, the second and control terminals of the third transistor being coupled to the ground level.

11. The digital latch control circuit of claim 8, wherein the resistor unit comprises:
- a resistor, coupled to the second terminals of the first and second transistors.

12. A power converter, comprising:
- a voltage converting circuit, for converting a power source voltage into a first output voltage and a second output voltage; and
- a digital latch control circuit having a plurality of digital logic gates powered by the second output power, the digital latch control circuit latching a voltage level of the second output voltage at a first predetermined level according to an over-voltage protection trigger signal, and the first predetermined level being capable of maintaining the operation of the digital logic gates;
- wherein the over-voltage protection trigger signal indicates that a voltage level of the first output voltage is higher than a protection threshold level.

13. The power converter of claim 12, wherein the digital latch control circuit comprises:
- a complementary switch unit, having a first transistor and a second transistor, the complementary switch unit selectively turning on one of the first and second transistors according to a control signal;
- a resistor unit, coupled to ground level and the second terminals of the first and second transistors; and
- a control module, coupled to the resistor unit and the complementary switch unit, for generating the control signal to control the complementary switch unit according to the over-voltage protection trigger signal, the supply voltage, and a voltage level at the second terminals of the first and second transistors;
- wherein the voltage level of the supply voltage is latched at the first predetermined level when the control module controls status of the first transistor to become conductive and status of the second transistor not to become conductive.

14. The power converter of claim 13, wherein the control module comprises:
- a logic gate, coupled to the second terminals of the first and second transistors, for receiving the voltage level at the second terminals of the first and second transistors and the over-voltage protection trigger signal to output a reset control signal; and
- a flip flop, having a reset input terminal coupled to the logic gate for receiving the reset control signal, a data input terminal for receiving the supply voltage, a clock input terminal for receiving the over-voltage protection trigger signal, and a data output terminal for generating an output signal corresponding to the control signal.

15. The power converter of claim 12, wherein the resistor unit comprises:
- a third transistor having a first terminal, a second terminal, and a control terminal, wherein the first terminal of the third transistor is coupled to second terminals of the first and second transistors, and the second and control terminals of the third transistor are coupled to ground level.

16. The power converter of claim 12, wherein the resistor unit comprises:
- a resistor, coupled to second terminals of the first and second transistors.

* * * * *